Oct. 25, 1960   R. C. BERGH ET AL   2,957,661
ANCHORING AND POSITIONING MEANS FOR AIRPLANES
Filed May 3, 1956   3 Sheets-Sheet 1
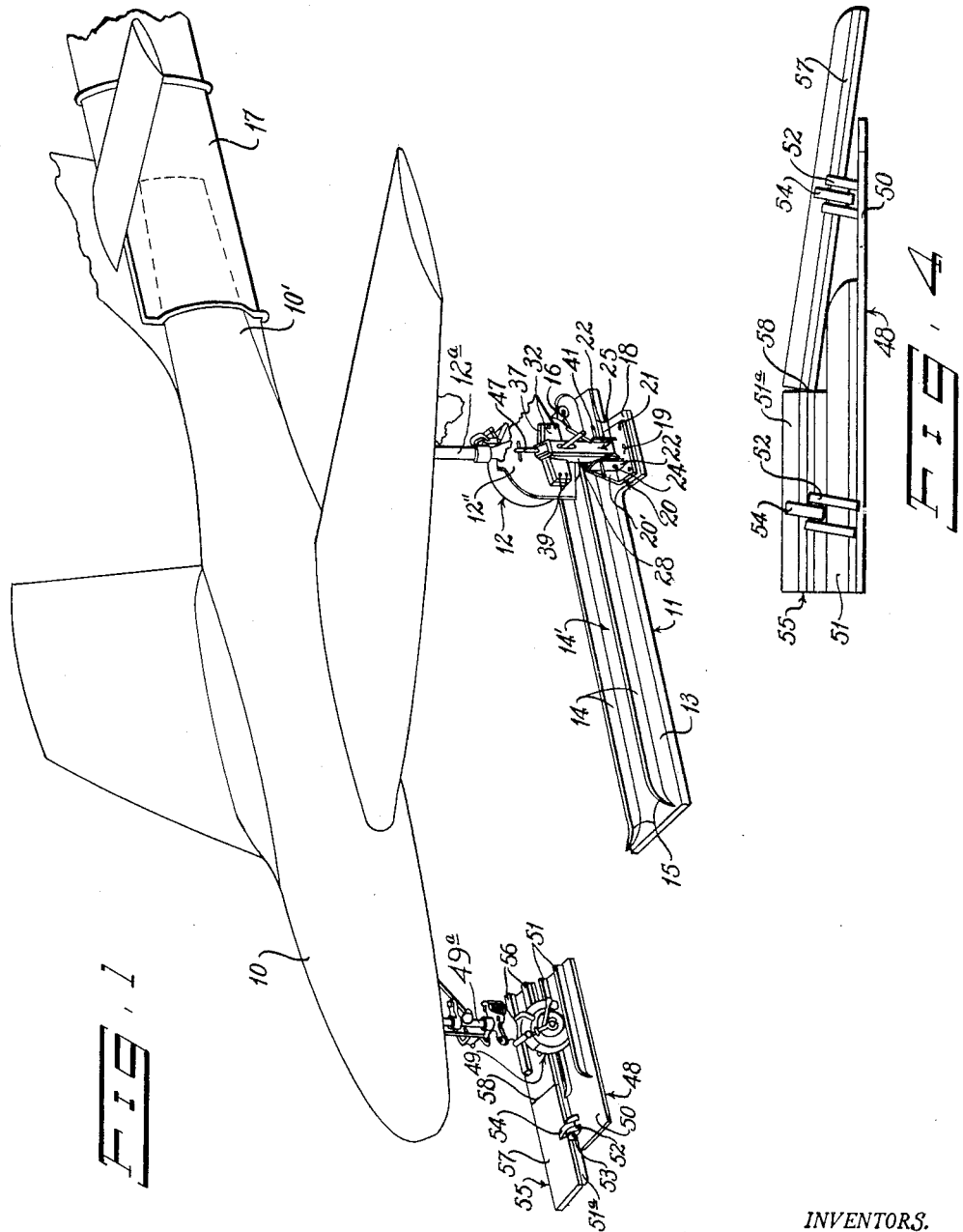
INVENTORS.
Roland C. Bergh
George J. Elsbeck
Eugene A. Muller
BY
John J. Sullivan
ATTORNEY.

Oct. 25, 1960  R. C. BERGH ET AL  2,957,661
ANCHORING AND POSITIONING MEANS FOR AIRPLANES
Filed May 3, 1956  3 Sheets-Sheet 2
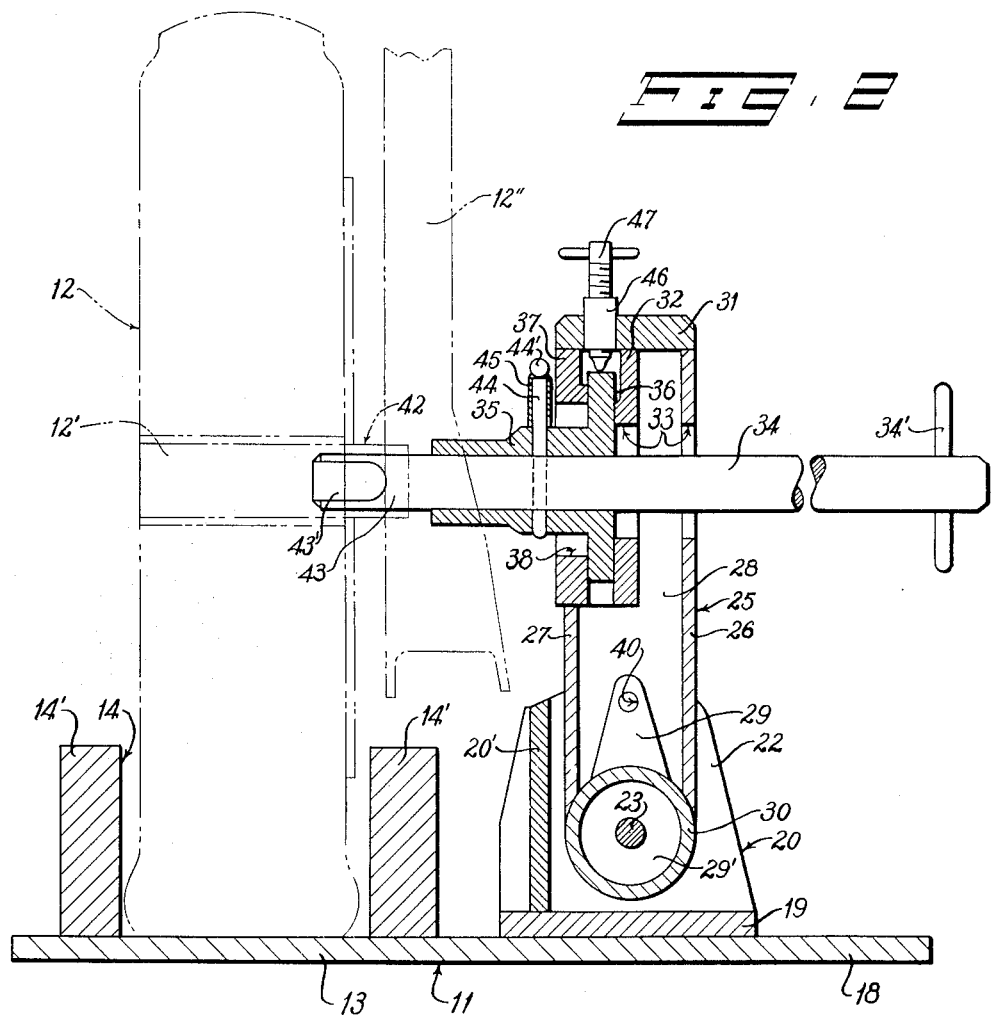
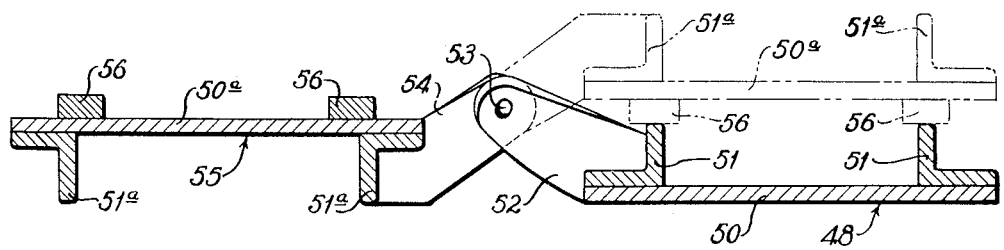
INVENTORS.
Roland C. Bergh
BY George J. Elsbeck
Eugene A. Muller
John J. Sullivan
ATTORNEY.

United States Patent Office 2,957,661
Patented Oct. 25, 1960

2,957,661
ANCHORING AND POSITIONING MEANS FOR AIRPLANES

Roland C. Bergh, Cedarhurst, George J. Elsbeck, Huntington Station, and Eugene A. Muller, Halesite, N.Y., assignors to Republic Aviation Corporation, near Farmingdale, N.Y., a corporation of Delaware Filed May 3, 1956, Ser. No. 582,417

12 Claims. (Cl. 244—115)

This invention relates to an anchoring or tie-down mechanism for aircraft and more particularly to a mechanism or device through which the airplane is fixedly secured to the ground and is maintained and secured in this position during warm-up and test operations of its engine.

The present invention is especially useful in conjunction with airplanes powered by jet engines and contemplates, among other things, a mechanism or device by which the tail or exhaust pipe of the jet engine can be aligned and associated with a muffler and the airplane held fixed with reference to such muffler during the operation of its engine while the airplane is on the ground.

Adapters or auxiliary tracks are embodied in this mechanism or device in order that the horizontal position of the exhaust pipe of the airplanes may be adjusted relative to the muffler.

In addition, the instant invention has in view means for securing the shock struts of the landing gear of the airplane against normal operation whereby vertical movement of the airplane relative to the ground muffler is eliminated during the operation of its engine.

With the above and other objects in view as will be apparent, this invention consists in the construction, combination and arrangement of parts all as hereinafter more fully described, claimed and illustrated in the accompanying drawings wherein:

Fig. 1 is a perspective view of an airplane powered with a jet engine mounted on and secured to the tracks of the present tie-down or anchoring device to show the coaction and connection between such tracks and the landing gear of the airplane whereby the exhaust pipe of the airplane is aligned and retained in association or cooperation with a ground muffler, the vertical tail of the airplane and part of the fairing of the main landing gear being broken away and only the entrance portion of the muffler being shown;

Fig. 2 is a transverse vertical section taken through one of the main tracks of the present invention and illustrates a main landing gear wheel in association therewith, as well as the means by which each main wheel of the airplane is releasably secured to the track, the landing gear wheel and its fairing being in phantom lines;

Fig. 3 is a transverse section of the track of the instant mechanism that cooperates with the nose wheel of the airplane to show in solid and phantom lines the inoperative and operative positions respectively of an adapter or auxiliary track by the use of which the height of the outlet end of the exhaust pipe of the airplane may be adjusted relative to the entrance of the muffler;

Fig. 4 is a side elevation of the track for the nose wheel of the airplane showing the adapter or auxiliary track in its operative position over the main track;

Figure 5:
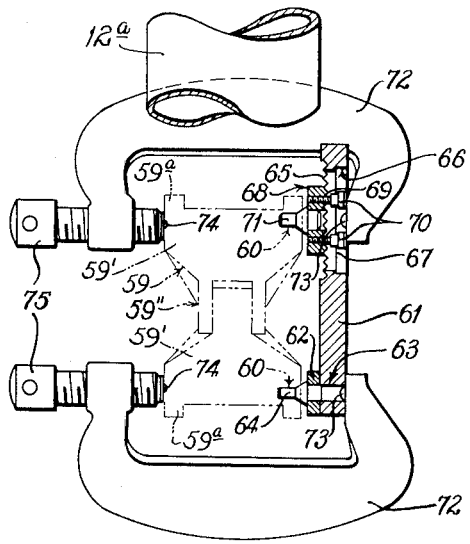
Figure 6:
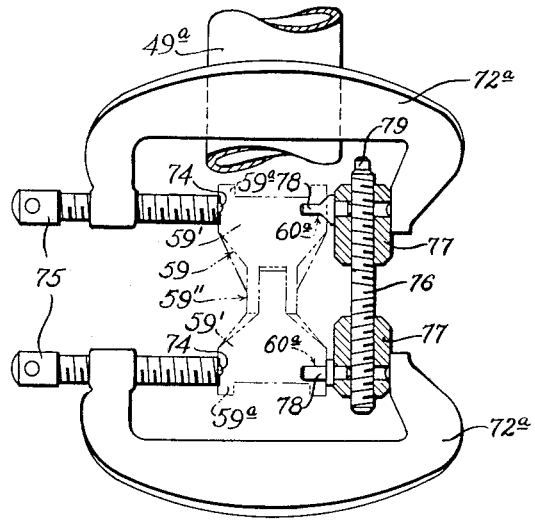

Fig. 5 is a section through the lock by which the shock or oleo struts of the main landing gears are secured against telescoping action and shows the means by which such lock may be adjusted to struts of different sizes, only a fragment of the strut being disclosed and the antitorsional device or scissors linkage between the telescopic sections of the strut being shown in phantom lines; and, Fig. 6 is a similar section through the lock employed in conjunction with the nose gear to show the means by which it may be regulated when connected to the nose strut for relatively small adjustments of the outlet of the exhaust pipe of the airplane relative to the muffler.

Jet engines used in airplanes on occasion must be operated while the airplane is on the ground for test, adjustment, warm-up, etc. and these ground operations develop noise in volume that can and does become objectionable in the vicinity of airfields. A muffler (forming no part of this invention) for suppressing this ground operational noise of jet engines has been developed and is to be associated with the outlet end of the exhaust pipe of the engine so that the hot gases discharged by the engine exhaust pipe are directed into the muffler and the normal operational noises of the engine are suppressed thereby.

When the jet engine of an airplane is in operation, there is a constant tendency on the part of the airplane to move in a forward direction unless this tendency is counteracted either by brakes or by the airplane being anchored or tied down. Should the airplane move in a forward direction when its exhaust pipe is cooperating with a muffler, a separation of this pipe from the muffler results and the noise of the engine operation is no longer suppressed.

Additionally, the ground operation of the engine at times may cause a vertical movement of the airplane which can result in a partial separation of the outlet end of the exhaust pipe and the muffler and can also develop a vertical vibration due in part to the telescopic movement of the landing gear struts.

The present invention proposes guides to position the airplane with the aft end portion of the tail pipe of its engine inserted into the entrance to or mouth of the muffler, means of adjustment being provided to compensate for variations in alignment together with means to anchor or tie down the airplane to render it immovable longitudinally, vertically, and laterally relative to the muffler. Means also are embodied in the guide assembly to secure the struts of the landing gear against telescopic movement while the airplane cooperates with the muffler.

Referring more particularly to the drawings, 10 designates an airplane powered by a jet engine having a standard tricycle type of landing gear. A pair of spaced tracks 11 is immovably secured in any suitable manner to the runway or like supporting surface to receive the wheels 12 of the main landing gear of the airplane 10. Each of the tracks 11 comprises a rectangular base plate 13 having upstanding guides or confining flanges 14 at or adjacent the longitudinal edges thereof to define a channel or space 14' for the reception of the main wheels 12 of the airplane 10. At its forward end each pair of guides 14 flares outwardly, i.e., away from each other, as at 15, to create a relatively wide mouth or entrance for the initial reception of the wheel 12 as the airplane is rolled upon the tracks 11.

Thus, when the airplane 10 is moved or backed up into a position where the main landing gear wheels 12 align with the tracks 11, continued movement of the airplane causes each main wheel to be received in the channel 14' at the mouth 15 of the associated track 11. The direction of movement of the airplane 10 thereafter is controlled and directed by the course of the channels 14' as defined by the guides or flanges 14. A stop or chock 16 is secured in or transversely across each channel 14' adjoining the muffler to arrest the movement of the wheels 12 along the tracks 11. These stops or chocks 16 are so positioned with reference to the tracks 11 and the muffler that when the wheels 12 engage them and their movement along the tracks is arrested, the tail pipe 10' of the airplane 10 is disposed in the mouth of an associated muffler 17.

Adjacent its aft end and on its outer side relative to the airplane 10, each base plate 13 is provided with a lateral extension 18 fixedly secured to the base plate. This extension 18 is disposed in a plane common to that of the base plate 13 and is similarly anchored or immovably secured to the runway or ground.

The base side 19 of an angle bracket 20 rests flush upon the upper face of each extension 18 and is secured thereto by a plurality of bolts or other fastening means 21. Each angle bracket 20 has a vertical supporting plate 20' secured to and projecting laterally from the upper face of the base side 19 adjacent its inner edge. A pair of spaced transverse lateral arms 22 projects from the upper surface of each base side 19 of the angle bracket 20 with the inner edge thereof secured to the outer face of its supporting plate 20'. Each pair of these arms 22 is pierced by aligned holes adjacent the lower ends thereof to receive a spindle 23 which traverses the space defined by and between the arms. The spindle 23 is threaded at its opposed or outer ends to receive nuts 24 which serve to hold the spindle in the openings in the arms 22.

A stanchion or post assembly is mounted on each spindle 23 to swing to and from an inoperative position parallel to the extension 18 on the track 11 and an operative position at right angles thereto (Fig. 2). To this end each stanchion comprises a hollow box-shaped post 25 formed by an outer face plate 26 and an inner face plate 27 interconnected by side plates 28 interposed between and welded or otherwise secured to corresponding edges of the plates 26 and 27. At its lower end each side plate 28 terminates in a convex or arcuate edge which is reinforced or strengthened by a plate 29 disposed flush against the inner face of its side plate 28 and fixedly secured thereto. These reinforcing plates 29 are each provided with a disc 29' integral with or fixed to the lower end of said plate to project inwardly of the stanchions. These discs 29' are aligned one with the other transversely of the stanchion and are inserted or seated in the open ends of a tube 30 where they are fixedly secured as by welding.

Thus, the tube 30 is disposed transversely across and forms the bottom of the post or stanchion 25, the lower ends of the plates 26 and 27 being secured to opposite sides of the tube to project tangentially therefrom.

The discs 29' of plates 29 and the underlying portion of the side plates 28 are pierced centrally by a hole through which the ends of the spindle 23 pass. The tube 30 is thus concentrically disposed about the spindle 23 and serves to completely enclose and house it.

The outer face plate 26 is rigidly secured at its other or upper end to the outer side of a generally rectangular cover or top plate 31 that is also secured to the adjoining edges of the side plates 28. The inner face plate 27 terminates short of the cover plate 31 whereby the upper edge thereof is disposed below and in spaced relationship to the lower face of the plate 31.

Secured to and depending centrally from the inner or under surface of the cover plate 31 is a mounting plate 32 which extends to a point substantially in the plane of the upper end of the inner plate 27. The outer face plate 26 and mounting plate 32 are pierced by the slots 33, the slot in the plate 26 being aligned with that of the plate 32 to permit the passage of a rod 34.

A closure plate 37 is interposed between the end of the face plate 27 and the inner surface of the top plate 31 where it serves as an extension of the face plate 27 and fills the space between such face plate and the top plate 31. The closure plate 37 is disposed substantially parallel to and is spaced from the mounting plate 32 and has a slot 38 which is aligned with the slots 33 in the outer face plate 26 and mounting plate 32 to permit the passage of the rod 34.

A bearing 35 encircles the rod 34 and passes through the slot 38 in the closure plate 37 to project from both sides thereof. Thus, one end portion of the bearing is situated within the post or stanchion 25 while its opposite end portion projects outwardly from the post. In order to prevent any movement of the bearing 35 longitudinally of its own axis relative to the post, that end of the bearing situated within the post is provided with a circumfrential, outstanding flange 36. This flange 36 may be integral with the bearing or attached thereto in any suitable manner so that it is a fixed or immovable part of the bearing. After the device is fully assembled, the flange 36 is disposed between the mounting plate 32 and the closure plate 37 where it and the bearing 35 are capable of limited movement normal to the longitudinal axis of the bearing and at the same time any movement of the bearing and flange along the longitudinal axis of the bearing is prevented.

The mounting plate 32 and the closure plate 37 each projects through and beyond the side plates 28 of the post or stanchion 25 and these projecting portions of the plates are coextensive (Fig. 1). At their corresponding ends, the projecting portions of the plates 32 and 37 are secured together by the bolts 39 or by any other means whereby, save for the limited movement of the bearing 35 and its flange 36, normal to its own axis, the plates 32 and 37 and the bearing 35 and its flange 36 become a rigid, unitary assembly carried at the end of the post 25.

When the post or stanchion 25 is assembled and mounted for rotation on its spindle 23, its disposition normal to the track 11 locates the rod 34 in axial alignment with the hub 12' of a landing gear wheel 12 located on the track 11 in contact with the stop or chock 16. Opposite sides 28 of the stanchion 25 are pierced by aligned holes 40 each of which is designed to register with a similar hole provided in the adjacent arm 22 adjoining the upper end thereof to the end that a retaining pin 41 may be inserted through the sides 28 of the post 25 and the arms 22. Thus, the stanchion or post 25 is releasably secured or locked to the stationary arms 22 and thereby held in its vertical position.

A recess or socket 42 is normally provided in the hub 12' or in the axle of the wheel 12 and in the event that no such recess or socket is normally provided, one can be formed therein. The fairing 12" of the landing gear wheel 12 may, if necessary, be provided with an opening in alignment with the recess or socket 42. When the post 25 is in its vertical position (as shown in Figs. 1 and 2) the recess or socket 42 is in substantial alignment with the rod 34 which may then be moved toward the wheel 12 until its end portion 43 is seated in the socket 42. If the socket 42 is provided with flat engaging surfaces, the end portion 43 of the rod 34 which coacts with such socket is formed with flat surfaces 43' to correspond to and engage with the flat surfaces of the socket.

At or near its outer end, the rod 34 is provided with a transverse handle 34' to facilitate its manipulation. Also, the bearing 35 and the rod 34 are pierced by transverse holes which are adapted to register one with the other when the end 43 of the rod 34 is fully seated in the recess 42 in the hub or axle 12' of the wheel 12. Thus, a retaining pin 44 passing through these aligned holes secures the rod 34 in engagement with the wheel as aforesaid.

At its outer extremity, the pin 44 has a transverse handle 44'. Adjacent the handle 44', the pin 44 is surrounded by a collar 45 to limit the extent of its insertion in the aligned holes in the rod 34 and bearing 35 and at the same time indicate the passage of the pin completely through the bearing 35.

The top plate 31 of the post 25 is pierced by an opening in substantial alignment with the flange 36 of the bearing 35. A sleeve 46 formed with internal threads is press-fitted or otherwise secured in this opening in the plate 31 and is adapted to receive a set screw 47. Thus, when the rod 34 is operatively connected to the main wheel 12 by its end portion 43 being disposed in the recess 42, and is secured in this position by the retaining pin 44, the set screw 47 may be tightened in its sleeve 46 to act against the flange 36 of the bearing 35. A downward force is thereby imposed on the wheel 12 of the airplane 10 to augment the bearing pressure of the wheel 12 on the track 11 through the rod 34 and to compress its tire and counteract the tendency of the wheel 12 to vibrate because of the elasticity of the tire.

Fixedly secured or anchored to the runway or supporting surface of the airplane 10 is a track 48 adapted to receive and guide the nose wheel 49 of the airplane 10. The location of the track 48 with respect to the main tracks 11 which coact with main wheels 12 of the airplane is such that when the nose wheel 49 of the airplane 10 is disposed in a fore and aft direction, movement of the main wheels 12 in their respective tracks 11 causes the concurrent and same movement of the nose wheel 49 in its track 48.

The design and construction of the nose wheel track 48 therefore is basically similar to and the equivalent of each of the main tracks 11. Thus, track 48 comprises a relatively long and narrow rectangular base plate 50 and a pair of upstanding guides or confining flanges 51 fixedly secured to and disposed adjacent and parallel to the longitudinal edges of the base plate 50. Each of these guides 51 may be angular in cross-section with one of the sides thereof disposed flush against the upper surface of the base plate 50 to which it is secured by welding or otherwise.

The track 48, however, differs from the tracks 11 in that an adapter or auxiliary means is connected to the track 48 to vary its effective height or level. More specifically, a plurality of hinge elements 52 is fixedly secured to the track 48 at spaced intervals along one of its longitudinal edges. These hinge elements 52 are parallelly disposed one to the other in spaced pairs and project upwardly and outwardly from the track 48. Adjacent its outer end, each pair of hinge elements 52 is pierced by aligned holes adapted to receive a pivot pin or bolt 53 which extends across the space defined by the adjacent hinge elements 52.

Similarly mounted on each pivot pin 53 to be disposed in the space between each pair of hinge elements 52 is a complementary hinge element 54. These individual hinge elements 54 are similar to the elements 52 and are fixedly secured in spaced relationship to one of the longitudinal edges of a secondary or auxiliary track 55, one element 54 being provided for each pair of elements 52. This auxiliary track 55 is constructed like the track 48 except that the hinge elements 54 thereof project outwardly and upwardly when the auxiliary track 55 is reversed and rests beside and in the same plane as the track 48. When the auxiliary track 55 is so disposed, the guides 51a thereof project downwardly and serve as supports for the auxiliary track. A pair of rests 56 identical one with the other is disposed adjacent the longitudinal edges of the base plate 50a of the auxiliary track 55 on the opposite face thereof with respect to guides 51a.

When the secondary or auxiliary track 55 is disposed in the foregoing position with respect to the main track 48, i.e., in a common horizontal plane therewith, the nose wheel 49 of the airplane 10 can operate on and over the main track 48 between the guides 51 thereof. Conversely, when it is desired to raise the effective level of the nose wheel track 48 the auxiliary track 55 may be swung about its pivots 53 to a position overlying the main track 48. This position of the auxiliary track 55 is illustrated in dotted lines on Fig. 3. In this position the rests 56 carried by the auxiliary track 55 abut the upper edges of the guides 51 of the main track 48 and serve to support the track 55 thereon and the guides 51a of the auxiliary track 55 will then assume an upstanding position relative to the base plate 50a and replace the guides 51 of the main track 48.

At its forward end, the auxiliary track 55 is provided with an extension track 57 which is so constructed and mounted that it forms a continuation of the track 55. This extension track 57 substantially abuts the end of the auxiliary track 55, as at 58, and is hinged to the main track 48 in the same manner as the auxiliary track. Thus, when the main track 48 is operative to support and guide the nose wheel 49 of the airplane 10 and the auxiliary track 55 is disposed in its inoperative position adjacent and approximately coplanar with the main track 48, the track extension 57 is likewise so disposed. When, on the other hand, the auxiliary track 55 is positioned over the main track 48 to receive and support the nose wheel 49 of the airplane 10, the track extension 57 also is swung to a like position to function as a ramp leading upwardly to the auxiliary track 55 over the end portion of the base plate 50 of the main track 48. This ramp leading to the auxiliary track 55 facilitates the movement of the nose wheel 49 of the airplane 10 on to the track 55 between the guides 51a thereof.

From the foregoing it is apparent that, by means of and through use of the auxiliary track 55, the nose wheel track assembly may be adapted to accommodate airplanes of different heights or having landing gear assemblies of different lengths or may be used to regulate the position of the outlet end of the exhaust pipe 10' relative to the mouth of the muffler 17.

In order to eliminate additional movement of the airplane relative to the ground or supporting surface as well as to the muffler 17, which might otherwise occur due to the telescopic action of the shock or oleo struts 12a and 49a employed in the landing gear assemblies, additional locking means is provided. Referring particularly to Figs. 5 and 6 of the drawings, this locking means is adapted to secure the components of each landing gear strut 12a and 49a against relative or telescoping movement and to that end is associated with the anti-torsional linkage or scissors 59 usually employed between such components. This linkage or scissors 59 of each strut consists of a pair of links 59' pivoted together at corresponding ends, as at 59", and having their opposite ends each pivoted to one of the movable components of the strut of the landing gear assembly, as at 59a. The associated components of the landing gear assembly are thereby capable of vertical relative or telescoping movement, but are restricted from any relative rotation.

Adjacent the ends pivoted or connected to the components of the strut, each of these links 59' is provided with a recess 60. Referring to Fig. 5 which illustrates the locking means employed in conjunction with the scissors 59 of the main landing gear assembly, a vertical bar 61 is positioned adjoining the linkage 59. Adjacent one end of the bar 61 is a boss 62 which is welded or otherwise secured to the face of the bar. This boss 62, and the bar 61 underlying it, is pierced by an aperture 63 in which one end of an index pin 64 is press-fitted or otherwise secured with its other end projecting laterally therefrom.

Adjacent its opposite end, the bar 61 is serrated, as at 65, along the same face thereof which carries the boss 62. Substantially coextensive with the serrated portion 65, the bar 61 is pierced by a slot 66. This slot 66 is shorter adjacent the serrated face of the bar 61 than at the opposite face whereby an internal shoulder 67 is formed within the slot 66.

An adjustable boss 68 having a serrated face 69 complementary to and mating the serrations 65 of the bar 61 is adapted to be removably secured to and engage the bar 61. This boss is substantially smaller than the serrated portion 65 of the bar 61 whereby its relative position thereon may be adjusted longitudinally of the bar. More specifically, the boss 68 is pierced by internally threaded openings each adapted to receive a set screw 70 passing through the slot 66 of the bar 61 and having its head bearing against the shoulder 67 in such slot. When the position of the boss 68 is determined relative to the bar 61 and the serrations 69 thereof meshing with the complementary serrations 65 of the bar 61, the set screws 70 may be tightened to secure and retain the boss 68 and bar 61 in their determined relative positions.

Centrally, the boss 68 is pierced by an aperture adapted to receive and fixedly engage therein one end of an index pin 71 like, and disposed approximately parallel to, the pin 64 at the opposite end of the bar 61. The index or connecting pins 64 and 71 projecting laterally from the bar 61 in the foregoing manner are adapted to be inserted in the recesses or openings 60 in opposite ends of the links 59' of the scissors 59 where they are respectively pivotally connected to each component of the main landing gear assembly and thereby form a rigid connection and lock such components against relative or telescoping movement.

From the foregoing, it is apparent that by means of the above locking connector or bar 61, the scissors or linkage 59 of each main landing gear assembly may be secured in a fixed position to prevent the normal operation thereof. In addition, by means of and through its adjustable boss 68, the locking connector or bar 61 may be adjusted within limits for cooperation with the scissors or linkages that may be embodied on different landing gear assemblies.

In order to secure and retain the locking connector or bar 61 in its operative position, a standard C clamp or yoke 72 is employed at either end thereof. If necessary, a projecting bead or teat 73 may be formed or produced on the working face on the arm of each yoke 72 to engage and be received within the slot 66 and aperture 63 in the bar 61 to prevent the clamp, when once connected in its operative position, from becoming displaced or disconnected. A similar bead or teat 74 is provided on the working end of a set screw 75 threaded through the opposite arm of each yoke 72 for engagement in a cavity in the adjoining end of a link 59' of the scissors 59 where it is pivoted to one of the components of the main landing gear assembly or in the end of the pivot between the link 59' and a component of the landing gear strut.

Manifestly, each struct of the main landing gear is provided with two yokes 72 each of which spans the scissors linkage 59 of the strut and engages and clamps one of the links 59' thereof where it is pivoted to a component of the landing gear. These two yokes 72 in combination hold the bar 61, the pins 64 and 71 and the set screws 75 in their respective operative positions to insure the complete locking of the links 59' and of the components of the landing gear strut against relative movement.

Fig. 6 shows a somewhat similar locking connector or spanner for use in conjunction with the scissors linkage 59 of the nose wheel landing gear. However, since the height of the forward end or nose of the airplane 10 from the ground or track 48 determines the position of the outlet or discharge end of the exhaust pipe 10', it is desirable that this locking connector be adjustable after it has been connected in its operative position to the end that vertical adjustments of the outlet of the tail pipe 10' may be made to insure its precise alignment with the mouth of the muffler 17. These adjustments are small but are sometimes essential in order to precisely locate the outlet of the tail pipe 10' in alignment with the mouth of the muffler 17.

To the above ends, the locking connector for the nose wheel landing gear assembly comprises a screw jack 76 threaded externally and oppositely on its opposed end portions. A nut 77 is operative on the threads at each end of the bolt 76. Each of the nuts 77 is pierced transversely by a hole for the reception of an index or connecting pin 78, functionally comparable to the pins 64 and 71. Each pin 78 projects laterally from its nut 77 toward the scissors linkage 59 to be received in a recess or pocket 60a in the end of each link 59' of the scissors 59 which is pivoted to a component of the strut of the landing gear nose wheel in the same manner as above described in connection with the main landing gear assembly.

At one of its ends, the screw jack 76 terminates in a head 79 having a flat surface for cooperation with a wrench or similar tool for rotation of the screw jack 76 in either direction relatively to the nuts 77. Thus, when the connector is attached to links 59' of the scissors 59, the rotation of the screw bolt 76 in one direction serves to extend or separate the nuts 77 while its rotation in the opposite direction contracts or moves said nuts toward each other. Such adjustments of the jack 76, through the corresponding adjustment of the angle between the links 59' of the scissors 59 results in elevation or depression of the nose of the airplane and an opposed adjustment of the outlet end of the tail pipe 10'. A yoke 72a is used to retain each nut 77 and opposed set screw 75 in engagement with one of the links 59' where it is pivoted to a component of the landing gear strut of the nose wheel. As in the device shown in Fig. 5, two yokes 72a are employed one for each of the links 59' of the scissors 59 of the strut 49a of the nose wheel and these yokes combine to hold the screw jack 76, its nut 77, pins 78 and set screws 75 in their respective operative positions.

The devices shown in Figs. 5 and 6 respectively prevent any pivotal relative movement of the links 59' of the scissors 59 of the struts 12a of the main landing gear wheels 12 and strut 49a of the nose landing wheel 49 and thereby prevent any telescopic movement of the components of the several struts. Thus, after the wheels 12 and 49 are positioned on the tracks 13 and 50, or alternatively on the track 55, the main wheels are locked to the tracks 13 and the struts 12a of the main wheels 12 and of the strut 49a of the nose wheel 49 are locked against telescopic movement, the entire airplane is immovable with reference to the tracks and to the muffler and is not subject to vibration or maladjustment relative to the muffler.

The word "wheel" as used herein and in the claims in describing the cooperation of the rod with the wheel is inclusive and is intended to refer to and include any part of the wheel assembly such as, but not limited to, the wheel per se, its axle, or the component of the strut attached to and carrying the wheel.

What is claimed is:

1. In a ground anchoring and positioning device for an airplane having a plurality of landing gear wheels and powered by at least one jet engine including an exhaust pipe the combination with a stationary muffler for the suppression of the ground operational noise of the jet engine, of a plurality of fixed substantially parallel tracks disposed in front of and leading to said muffler, one track being provided to receive and guide each landing gear wheel as the airplane moves toward the muffler to place the outlet end of the engine exhaust pipe in cooperation therewith, a fixed stop on each track adjacent the aft end thereof to arrest movement of the wheel thereon toward the muffler at a predetermined location to dispose the outlet end of the engine exhaust pipe in alignment with the muffler, a post mounted on a spindle carried by each track adjoining the location of the wheel thereon when in contact with said stop to swing perpendicularly to and from a position vertical to the track, a releasable lock securing the post in its position vertical to the track, and a rod mounted on the post for reciprocation transversely thereof and projecting into a mating socket in the wheel to secure it against movement along the track in a direction away from the muffler.

2. In a ground anchoring and positioning device for an airplane having a plurality of landing gear wheels and powered by at least one jet engine including an exhaust pipe, the combination with a stationary muffler for the suppression of the ground operational noise of the jet engine, of a plurality of fixed substantially parallel tracks disposed in front of and leading to said muffler, one track being provided to receive and guide each landing gear wheel as the airplane moves toward the muffler to place the outlet end of the engine exhaust pipe in cooperation therewith, a stop on each track adjacent the aft end thereof to arrest movement of the wheel thereon toward the muffler upon the outlet end of the engine exhaust pipe being placed to discharge into the muffler, a hollow post mounted for rotation on each track at a point adjoining the wheel thereon when in contact with said stop to swing to and from a position vertical to the track, a releasable lock securing the post in its position vertical to the track, a transverse rod carried by the post and projectable into a socket in the wheel to lock said wheel against all movement along the track, a bearing fixedly mounted on said rod and disposed within the post, and adjustable means to apply a varying lateral force on the bearing towards the track.

3. A ground-anchoring mechanism for an airplane having a tricycle landing gear consisting of a nose wheel and at least two main wheels, comprising a stationary track individual and adapted to receive and guide each of said wheels into a predetermined position on their respective tracks, an auxiliary track hinged at and along one of its longitudinal edges to the track for the nose wheel and operable to and from an inoperative position parallel to, spaced from and laterally coplanar with the nose wheel track and an operative position elevated above and resting on said nose wheel track, and a connector carried by each track for the main wheels for engagement with its associated wheel to secure the track against all movement relative to the track.

4. An anchoring mechanism for an airplane having a tricycle landing gear consisting of a nose wheel and at least two main wheels comprising a stationary track individual to and adapted to receive and guide each of said wheels, the tracks for said main wheels having a fixed stop in its length for contact with the associated wheels and thereby locating said wheels in a predetermined position on the tracks, an auxiliary track hinged at and along one longitudinal edge of the track for the nose wheel adapted to swing relative to the main track to and from an inoperative position coplanar with and beside said main track and an operative position overlying said main track, a hinged extension for the forward end of the auxiliary track to form a ramp leading over the end of the main track to said auxiliary track when disposed over the main track, and connection means between each of the main wheels and its track operative to prevent all relative movement therebetween.

5. An anchoring and positioning device for an airplane having a tricycle landing gear including a nose wheel and main wheels each wheel being carried by a shock strut comprising a stationary track individual to and adapted to receive and support each of the main wheels, guides to define the path of movement of said main wheels on and over said tracks, a fixed stop in the length of said tracks to dispose said main wheels in a predetermined position relative thereto, a post carried by said track to engage and secure said main wheels against movement relative to the tracks when disposed in the predetermined position aforesaid, and a composite track assembly disposed in a fixed position on and parallel to the ground associated with the nose wheel to receive and support said nose wheel concurrently with the reception of the main wheels by their respective tracks, said assembly including relatively movable track surfaces for superposing one on the next whereby the nose wheel may be disposed at one of several heights with respect to the ground.

6. An anchoring and positioning device for an airplane having a nose landing gear wheel and two main landing gear wheels comprising substantially parallel fixed tracks one for each of the aforesaid landing gear wheels, a stop adjacent the aft end of each track cooperating with a main landing wheel to arrest the movement of the wheel thereon in a predetermined location, a post pivotally connected to each main landing wheel track adjoining the location of its wheel in contact with a stop as aforesaid to swing to and from a position vertical to the track, a lock securing the post in its position vertical to the track, a releasable connector carried by each post and in engagement with the adjacent main landing gear wheel located on the track, and an auxiliary track substantially coextensive in length and hinged to the side of the track coacting with the nose landing gear wheel adapted to swing over and rest upon the first track, said auxiliary track terminating at its forward end in a ramp disposed over the entrance to the first track when disposed over said first track.

7. An anchoring means for an airplane having a plurality of landing gear wheels comprising a stationary track disposed parallel to the ground and individual to each of said wheels, a stanchion mounted on a fixed pivot parallel to and on one side of each track for movement in a plane perpendicular to said track to and from vertical and horizontal positions, a lock to secure said stanchion in the vertical position, a laterally adjustable rod mounted transversely of the stanchion and projectable into mating engagement with the wheel on the track when the stanchion is located in the vertical position, a locking pin to secure the rod in such engagement aforesaid, and a set screw operable on and against said rod in a downward direction whereby the wheel is immovable relative to the track.

8. A ground anchoring and positioning means for an airplane having a plurality of ground-engaging wheels comprising a channelled stationary guiding track parallel to the ground individual to each of said wheels, an upright hollow stanchion permanently mounted on at least one track adjacent the wheel thereon, a rod piercing and projecting at right angles to the stanchion to releasably engage the wheel and secure it against movement relative to the track, and an adjustment carried by the stanchion and operative on and against said rod internally of the stanchion in a downward direction.

9. A mechanism for immovably anchoring an airplane mounted on resilient, tricycle-wheel supporting struts each formed by telescoping components and including a pivoted scissors linkage connecting the strut components to prevent relative rotary movement thereof comprising a plurality of fixed tracks one individual to and adapted to receive and support each wheel and strut, a connector carried by the track of each main wheel to engage the wheel thereon and hold it against movement relative to the track, a fixed length spanner connecting opposite ends of the scissors linkage of each wheel whereby the strut components are rigidly connected one to the other and to the track through the wheel, and an adjustment on the spanner of the nose wheel to regulate the effective length thereof.

10. A ground anchoring means for an airplane having a pair of main wheels and a nose wheel each mounted thereon by a resilient shock strut comprising a plurality of fixed tracks, one individual to and adapted to receive and support one of said wheels, a locking connector carried by each track cooperating with a main wheel to engage and secure its wheel against all movement relative to the track, a rigid connector engaging opposed ends of each shock strut to secure it against resilient operation as aforesaid, and an adjustment on the rigid connector of the nose wheel to vary the length thereof whereby the nose and tail of the airplane are raised and lowered relative to the ground.

11. A ground anchoring means for an airplane having several ground-engaging wheels each mounted on a resilient, normally telescopic shock strut comprising an immovable track individual to each wheel to support said wheel, locking means carried by each track to engage and secure the wheel thereon against relative movement, and a rigid locking connector between the opposed ends of each shock strut to fixedly secure said shock strut against resilient, normal telescopic operation aforesaid whereby the wheel, shock strut and track form an immovable support for the airplane, the length of said connector being adjustable.

12. A ground anchoring and positioning means for an airplane having a ground-engaging wheel mounted on a telescoping shock strut comprising a fixed track defined by side flanges and a fixed chock to receive and guide said wheel to a predetermined position on said track, a locking connector attached to and carried by the track adjacent said chock to engage the wheel and fixedly secure it in said predetermined position on the track, said connector including a rod disposed at right angles to the wheel and a clamp normal to said rod operative thereon in a vertically downward direction whereby said wheel is forced against the ground, and a supplemental lock connecting opposed ends of the shock strut to engage and secure it against normal telescoping operation whereby the wheel, shock strut and track form in effect an integral stationary support for the airplane.

References Cited in the file of this patent

UNITED STATES PATENTS

| | | |
|---|---|---|
| 1,174,410 | Hajasok | Mar. 7, 1916 |
| 1,580,275 | Ashenfelter | Apr. 13, 1926 |
| 2,483,078 | Williams | Sept. 27, 1949 |
| 2,577,330 | Johnston | Dec. 4, 1951 |
| 2,611,355 | Ashwood | Sept. 23, 1952 |
| 2,674,335 | Lemmerman | Apr. 6, 1954 |
| 2,702,432 | Martin | Feb. 22, 1955 |
| 2,709,916 | Erickson | June 7, 1955 |
| 2,798,743 | Olesten | July 9, 1957 |

FOREIGN PATENTS

| | | |
|---|---|---|
| 418,144 | Germany | Sept. 1, 1925 |
| 720,856 | Great Britain | Dec. 29, 1954 |